June 2, 1970  J. DUNNOUS  3,515,164
FLOW DELIVERY SYSTEM
Filed Oct. 16, 1968

INVENTOR
JACK DUNNOUS
BY James B. Tiffany Jr.
ATTORNEY

United States Patent Office 3,515,164
Patented June 2, 1970

3,515,164
FLOW DELIVERY SYSTEM
Jack Dunnous, Philadelphia, Pa., assignor to Servoflo Corp., Lexington, Mass., a corporation of Massachusetts
Filed Oct. 16, 1968, Ser. No. 768,095
Int. Cl. F04b 23/04, 49/00; F04d 15/00
U.S. Cl. 137—154        2 Claims

ABSTRACT OF THE DISCLOSURE

A fluid system for delivering and maintaining a constant flow of fluid comprising one or more pumps having a manually adjustable regulator positioned in the outlet line to maintain the magnitude of flow in fixed proportion with a secondary flow of fluid.

This invention relates generally to fluid systems for delivering and maintaining a constant flow of fluid. More particularly, it is suited for liquids having varying viscosities and varying operating pressure levels. The techniques described in this invention may readily be used to program the flow of a fluid according to an arbitrary command or control of the flow in such a way as to maintain its magnitude in fixed proportion with another stream as in blending processes.

Various methods for generating a desired constant flow have been utilized in the past and one method is accomplished by means of a positive displacement pump driven by a variable speed motor set at the appropriate speed. The disadvantage of this procedure is that variations in pump delivery result as a function of fluid viscosity and the pressure drop across the pump. In addition to these inherent variations, an accurate positive displacement pump may incorporate many moving parts, tight seals and closely held tolerances. All these factors make many of these pumps impractical for use with certain liquid chemicals, and in most cases the cost of such accurate pumps is relatively high.

Another method in use for generating anaccurate flow involves the use of a flowmeter and a pump. In this case, the flowmeter is placed downstream of the pump and the ouptut signal of the flowmeter is used to control the pump speed so as to maintian the desired flow level. This method, which is perhaps the most widely used, results in many instances, in expensive systems and frequently requires the use of the components not readily compatible with many liquid chemicals. Again the accuracy of the system depends, by and large, on the sesitivity of the flowmeter to variations of fluid pressure and fluid viscosity.

Broadly stated, this invention is more particularly concerned with the use of a relatively simple positive displacement pump such as a gear pump to achieve the desired result. Such a pump may have wide tolerances, is relatively easy to maintain and is inexpensive.

In most positive displacement pumps the principal cause which directly affects the pump delivery is the leakage flow across the pump elements and seals. This leakage flow varies as a function of the pressure drop across the pump and the fluid viscosity. The higher the pressure drop the higher the leakage and the lower the fluid viscosity the higher the leakage for a given pressure drop. Thus, for a given pump speed the pump delivery may vary quite extensively.

This invention specifically deals with a means to maintain the pressure drop across a positive displacement pump at a very low level and as close to zero as possible. In this matter, the leakage across this particular pump is reduced to zero and the volumetric efficiency of the pump is maintained close to 100%. This being achieved, the flow out of this pump is then maintained at a constant value which is proportional to the pump speed.

To incorporate this principle, this invention utilizes two pumps in series driven from a common source either by gears, belts, chains or other suitable coupling. The first pump performs the normal pumping operation while the second one acts as a metering element. A suitable differential pressure responsive means is used to maintain about equal pressure at the inlet and the outlet of the second pump by bypassing some flow back to the reservoir. For this system to function, the first pump must displace more fluid than the second pump, a feature which may readily be achieved by either sizing the pumps differently or using the same size pumps and driving the first pump at a faster rate than the second pump. In either case, since the two pumps are geared to the same external power source, one pump cannot drive the other nor can there be a relative speed change because of pressure variations.

The object of this invention is to provide a simple, novel and effective method for delivering and maintaining a constant flow of fluid.

Another object of this invention is to provide a method for controlling the flow of a fluid so as to maintain its magnitude fluid proportion to another fluid to render an accurate blending of both fluids.

Other objects of this invention will in part be obvious and will in part appear hereinafter.

To the accomplishment of this and the foregoing related objects, the present invention then consists of the means hereinafter fully described and particularly pointed out in the claims, the annexed drawings and following setting forth in detail certain means in the carrying out of the invention, such disclosed means illustrating, however, but one of the various methods by which the principle of the invention may be employed.

Figure 1:
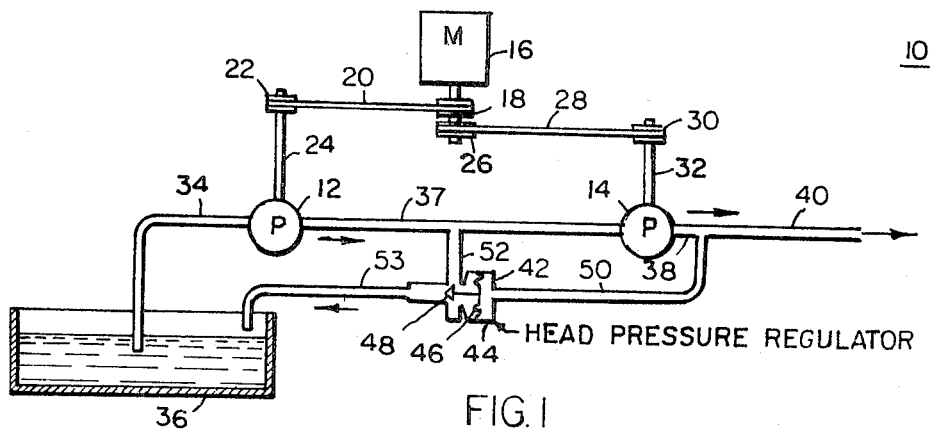
FIG. 1 is a block plan illustrating one embodiment of the invention using two pumps and a back pressure regulator.

Reference is now made to the drawings wherein an illustrative embodiment of the flow delivery system, a construction made in accordance with the present invention and designated by the reference numeral 10 as shown.

In FIG. 1 there is illustrated the flow delivery system 10, comprising a pair of pumps 12 and 14, driven by means of an electric motor 16. Pump 12 is connected to the motor 16 by pulley 18 driving a belt 20 through pulley 22 transmitting the drive through the pump shaft 24. Pump 14 is driven by the same motor 16 through pulley 26 by means of belt 28 driving pulley 30 which in turn transmits power through pump shaft 32. The relative size of the pulleys is such that for a given and pre-determined motor speed, pump 12 displaces more fluid than pump 14. In the system, the intake side of pump 12 is directly connected by means of suitable piping 34 to a reservoir 36. The flow of fluid through this side of the system is that the pump 12 takes fluid from the reservoir 36 through the intake line 34 and discharges to the outlet of conduit 37.

Pump 14 has its intake side connected to conduit 37 to pick up delivery from pump 12 and discharges through the outlet 38 into the main 40 for use as required.

A back pressure regulator 42 comprising a standard housing 44 and having a pressure sensitive diaphragm 46 disposed therein adapted to regulate a valve element 48 is situated in conduit 50. A bypass pipe 52 extends from outlet conduit 37 through the valve element 48 and discharges into the reservoir 36 through discharge line 53.

By referring to FIG. 1, it will be seen that the discharge pressure of pump 14 is applied to the diaphragm 46 to open and close the valve element 48 and control the flow of fluid from the discharge side of pump 12. The function of the regulator 42 is to maintain a low pressure differential between the intake line 37 and the outlet side 38 of pump 14. If it is desired to induce a bias pressure to establish a positive or negative differential across pump 14, a spring loaded check valve (not shown) can be inserted in line 52 to establish the required bias.

This becomes essential in certain types of gear pumps, where a positive pressure differential is required to maintain a seal between the gear teeth and to improve the efficiency. Other means to establish a bias pressure would be to spring load the diaphragm 46 or to install loaded check valves (not shown) in line 52.

Figure 2:
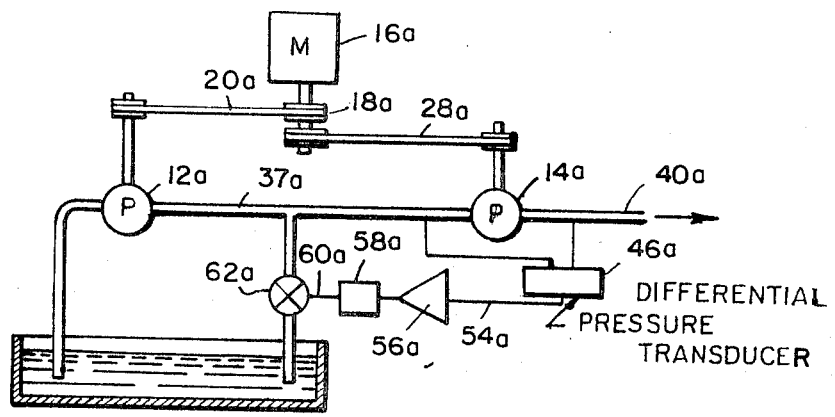
FIG. 2 is a block plan illustrating a similar system using transducers, and an amplifier and an actuator in order to operate a valve such as to maintain a low pressure drop across the second pump.

Referring to FIG. 2 there is shown a modified form of the invention wherein a pair of pumps 12a and 14a are driven through suitable belts and pulleys 18a, 20a and 22a by an electric motor 16a.

The pressure differential between points 37a and 40a are sensed by means of a conventional differential pressure transducer 46a. The output of the transducer 46a is directed through line 54a through an electronic amplifier 56a which amplifies the signal which in turn energizes a valve actuator 58a. The valve actuator 58a is connected by electrical or hydraulic means 60a to by-pass valve 62a and the opening and closing thereof maintains a negligible pressure drop across the output of pump 14a.

Incorporated within the scope of this invention is the basic principle enabling pump 14a to be replaced by an externally driven turbine meter (not shown) or any similar flow rotatable device to accomplish the same result.

Figure 3:
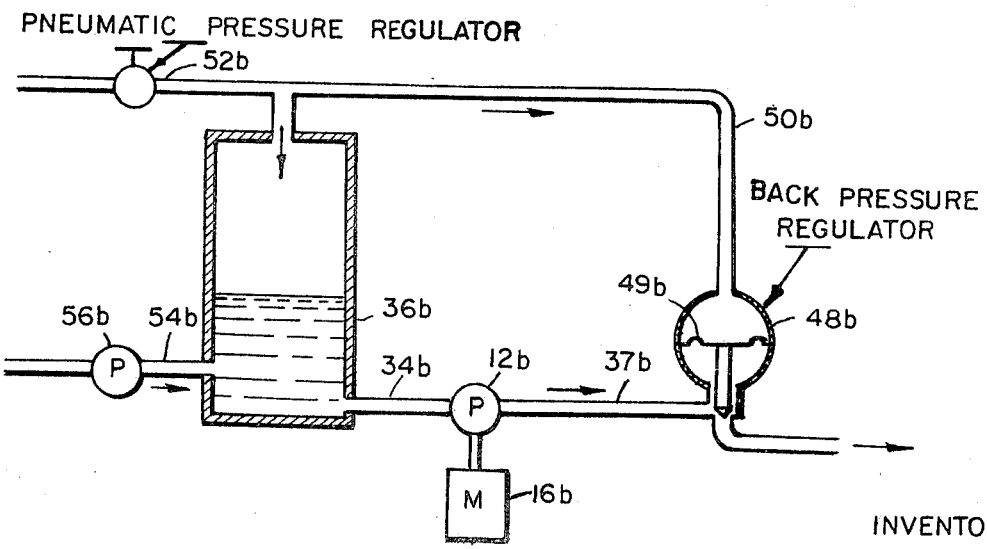
FIG. 3 is a block plan illustrating another embodiment of this invention using one pump and a back pressure regulator.

Referring to FIG. 3 there is illustrated a further modification of the flow system in which a single pump 12b has an inlet directly connected to a reservoir 36b by means of suitable piping 34b. Pump 12b is driven by a motor 16b and discharges through an outlet line 37b to a pneumatically operated back pressure valve 48b. The back pressure valve 48b is supplied by means of a constant pressure supply through line 50b having a supply regulator 52b positioned intermediate an external supply (not shown) and the regulator 48b. The pressure regulator 48b consists of a pressure actuated diaphragm 49b in direct connection with the output of the supply regulator 52b.

The supply regulator 52b is also connected to the reservoir 36b so that an equivalent pneumatic pressure is supplied to both the reservoir 36b and the back pressure diaphragm 49b. By this means, the pressure at the pump outlet 37b is maintained at about the same intensity as the pressure within the reservoir 36b and also as the pressure on the inlet side 34b of the pump 12b. Therefore, the flow through the pump 12 is directly proportional to the pump speed. To provide for losses within the system a make-up line 54b supplied by pump 56b is directly connected to the reservoir.

In determining the flow, since it is directly proportional to the pump speed the motor control is of a variable nature. If the motor is of the direct current type, an auxiliary tachometer feedback (not shown) is provided whose output is compared with a desired command signal and when amplified will reduce the differential to negligible proportions.

Having demonstrated the control of one flow rate, it becomes obvious to those skilled in the art that a method for simultaneously controlling the flow rate of several streams can be readily achieved. This may be accomplished by using a multiplicity of dual pump systems receiving different fluids from different reservoirs and having each set of pumps driven individually by an external source. In this manner, by controlling the speed of each individual driving source, the flow rates of several streams may be varied and at the same time maintain an exact ratio to each other. This type of control is necessary in many chemical processes dealing with blending or mixing several fluids, such as is found in the preparation of emulsions for the graphic field and the production of epoxies, polyurethanes, polyamides and numerous varieties of plastics.

A further step in using the techniques described in this invention may be in programming the flow of a single or a multiplicity of fluid streams according to instructions punched on a suitable card or tape. This procedure lends itself to reproducing accurate flow rates readily and automatically without excessive waste of fluids.

For more complex systems where extremely accurate differentials must be maintained, a digital type tachometer (not shown) can be utilized which generates a pulse rate proportional to the rotational speed. This pulse output can be converted and readily compared with an external binary coded decimal signal and the difference may be used to control the motor speed.

While there have been described herein what are at present considered preferred embodiments of the invention, it will be obvious to those skilled in the art that modifications and changes may be made thereon without departing from the essence of the invention. It is therefore to be understood that the exemplary embodiments are illustrative and not restrictive of the invention, the scope of which is defined in the appended claims and that all modifications that come within the meaning and range of equivalency of the claims are intended to be included therein.

What is claimed is:

1. In a fluid delivery system containing a reservoir and pump means connected thereto, pressure responsive valve means disopsed in the iutlet of said pump means, said pressure responsive valve means atcuated by variations in an independent and externally supplied fluid pressure exerted simultaneously on the reservoir and the pressure responsive valve means, whereby equal pressure may be maintained at the reservoir and at the pump outlet.

2. In a fluid delivery system containing a fluid reservoir, a pump having an inlet connected by suitable piping to the reservoir, a manually adjustable regulator disposed in the outlet of said pump, a pneumatic pressure source directed equally to said fluid reservoir and to said regulator, whereby the outlet pressure of said pump is maintained equal to the pressure exerted within said reservoir.

References Cited

UNITED STATES PATENTS

| 1,760,070 | 5/1930 | Kinsella | 103—5 |
| 2,353,188 | 7/1944 | Roosa | 103—5 |
| 2,956,581 | 10/1960 | Pearson | 103—25 X |
| 3,230,887 | 1/1966 | Stallman | 103—5 |
| 3,233,651 | 2/1966 | Smith | 103—11 |

DONLEY J. STOCKING, Primary Examiner

W. J. KRAUSS, Assistant Examiner

U.S. Cl. X.R.

137—566; 417—252